(12) United States Patent
Leany et al.

(10) Patent No.: US 8,473,110 B2
(45) Date of Patent: Jun. 25, 2013

(54) SYSTEMS AND METHODS FOR CONTROLLING OPERATION OF A MOTOR

(75) Inventors: Thaylen Leany, Fort Wayne, IN (US);
Steve Zavodny, Fort Wayne, IN (US);
Vijay D. Gurudasani, Gujarat (IN);
Brian L. Beifus, Fort Wayne, IN (US);
Michael R. Koller, Columbia City, IN (US); Edward Yager, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 582 days.

(21) Appl. No.: 12/323,250

(22) Filed: Nov. 25, 2008

(65) Prior Publication Data

US 2010/0131083 A1    May 27, 2010

(51) Int. Cl.
*G05D 7/00* (2006.01)

(52) U.S. Cl.
USPC ............................................. 700/282; 700/83

(58) Field of Classification Search
USPC .......................................................... 700/83
See application file for complete search history.

(56) References Cited

U.S. PATENT DOCUMENTS

| | | | |
|---|---|---|---|
| 4,767,280 A | 8/1988 | Markuson et al. | |
| 5,151,017 A | 9/1992 | Sears et al. | |
| 5,585,025 A | 12/1996 | Idland | |
| 5,628,896 A | 5/1997 | Klingenberger | |
| 6,160,365 A * | 12/2000 | Younger et al. | 318/16 |
| 6,481,973 B1 | 11/2002 | Struthers | |
| 2003/0172451 A1 | 9/2003 | Loyd et al. | |
| 2003/0196942 A1 | 10/2003 | Jones | |
| 2003/0203840 A1 | 10/2003 | Worley et al. | |
| 2004/0025244 A1 | 2/2004 | Loyd et al. | |
| 2004/0034918 A1 | 2/2004 | Loyd et al. | |
| 2005/0123408 A1 | 6/2005 | Koehl | |
| 2006/0045750 A1 | 3/2006 | Stiles | |
| 2007/0114162 A1 | 5/2007 | Stiles et al. | |
| 2007/0154320 A1 | 7/2007 | Stiles, Jr. et al. | |
| 2010/0017954 A1 * | 1/2010 | Peterson et al. | 4/541.2 |

* cited by examiner

*Primary Examiner* — Ryan Jarrett
(74) *Attorney, Agent, or Firm* — Armstrong Teasdale LLP

(57) ABSTRACT

A method for editing a motor profile is described. The method includes receiving a stored motor profile selection via a user interface, and receiving user inputs via the user interface. The user inputs include instructions relating to an edit of the selected motor profile. The method also includes storing the edited motor profile.

30 Claims, 8 Drawing Sheets

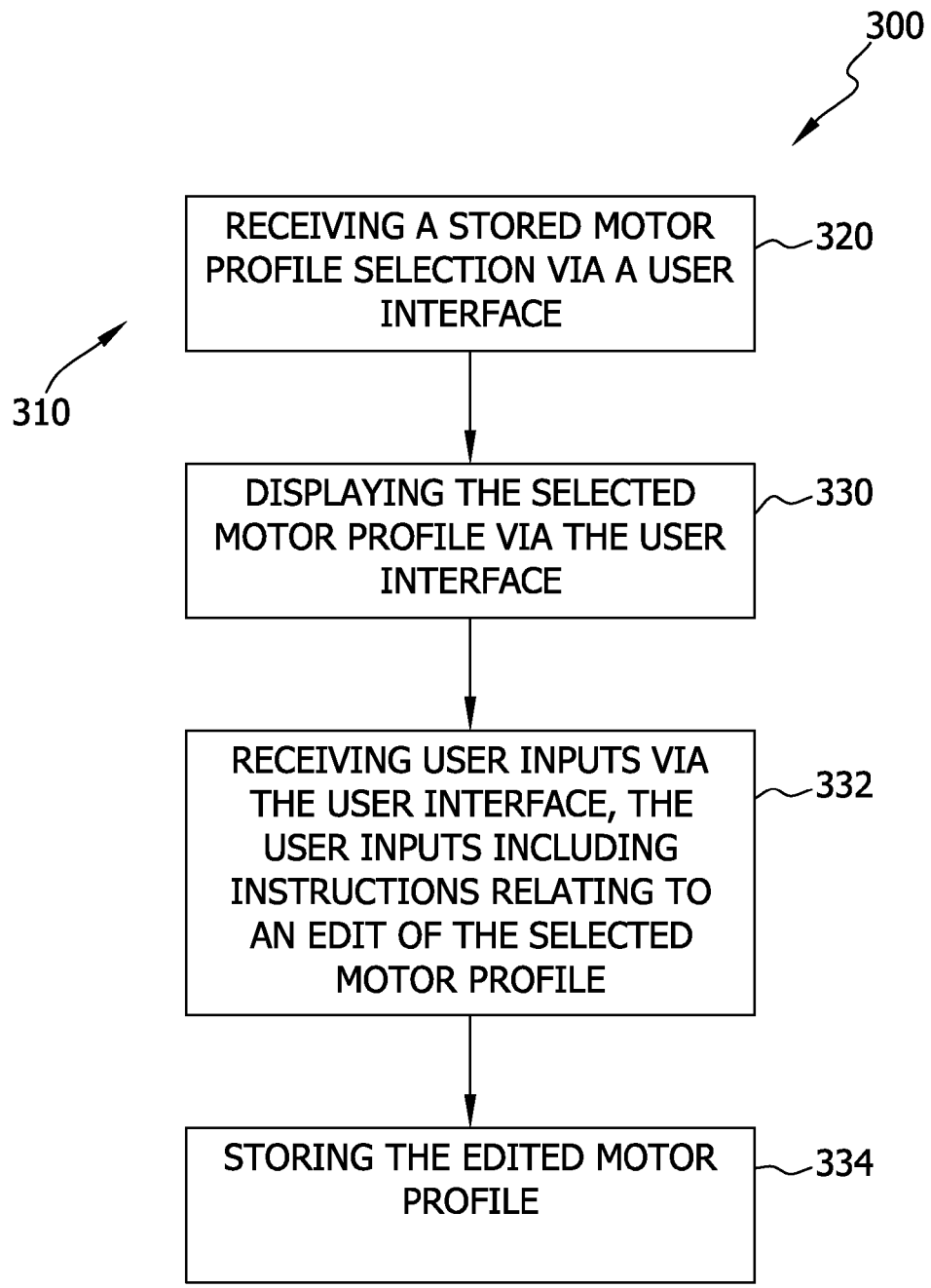

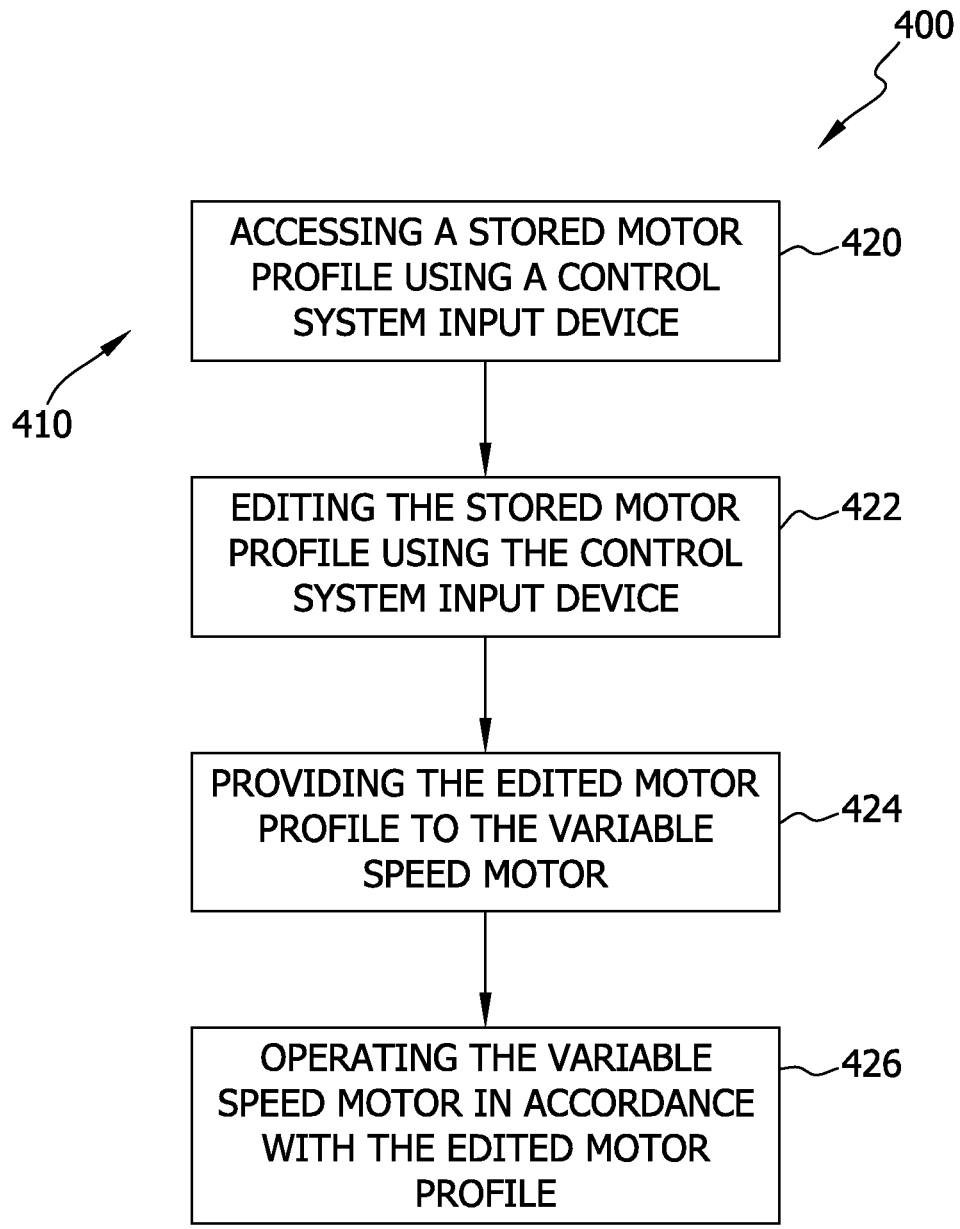

US 8,473,110 B2

SYSTEMS AND METHODS FOR CONTROLLING OPERATION OF A MOTOR

BACKGROUND OF THE INVENTION

The field of the invention relates generally to controlling operation of a variable speed motor, and more specifically to selection of and editing of stored motor profiles during use of the motor.

Spas and hot tubs are generally used for relaxation and other therapeutic purposes. A basin or tub structure holds a supply of water. Typically, a spa or hot tub includes a circulation pump as part of a water circulation and heating system. The pump, in combination with a pump motor, facilitates filtering and heating of the water by removing water from the tub structure, through a filter and/or heater, and returning the water into the tub structure. The water is generally returned to an interior of the tub structure through a plurality of water jets or nozzles. The water jets facilitate providing a pressurized flow of water into the tub structure. The spa may also include a plurality of main pumps to increase the pressure of the return water flow, and/or to provide a pulsating flow of water.

In some known spas, along with adjusting a temperature of the water in the tub, a user can input a length of time that the pressurized return flow of water is pumped into the tub. The user may also be able to select a high or low level of pulsating flow. However, limitations in the capabilities of motors typically used in spa and hot tub applications, along with control system limitations, prevent further customization of spa operation while maintaining efficient operation of the pump motors.

BRIEF DESCRIPTION OF THE INVENTION

In one aspect, a method for editing a motor profile is provided. The method includes receiving a stored motor profile selection via a user interface, and receiving user inputs via the user interface. The user inputs include instructions relating to an edit of the selected motor profile. The method also includes storing the edited motor profile.

In another aspect, a method for end user operation of a variable speed motor is provided. Operation of the variable speed motor is controlled based on at least one stored motor profile. The method includes accessing a stored motor profile using a control system input device, editing the stored motor profile using the control system input device, providing the edited motor profile to the variable speed motor, and operating the variable speed motor in accordance with the edited motor profile.

In yet another aspect, a motor control system is provided. The motor control system includes a processing device and a memory device coupled to the processing device. The memory device is configured to store at least one motor profile. The motor control system also includes a display device coupled to the processing device. The display device configured to display at least one of a catalog of motor profiles and motor profile editing options. The motor control system also includes an input device coupled to the processing device. The input device is configured to provide the processing device with motor profile editing instructions from a user. The processing device is configured to provide the edited motor profile to a brushless DC motor.

BRIEF DESCRIPTION OF THE DRAWINGS

FIG. 8 is a flow chart of an exemplary method for controlling operation of a motor.

FIG. 9 is a flow chart of an exemplary method for controlling operation of a motor.

DETAILED DESCRIPTION OF THE INVENTION

Figure 1:
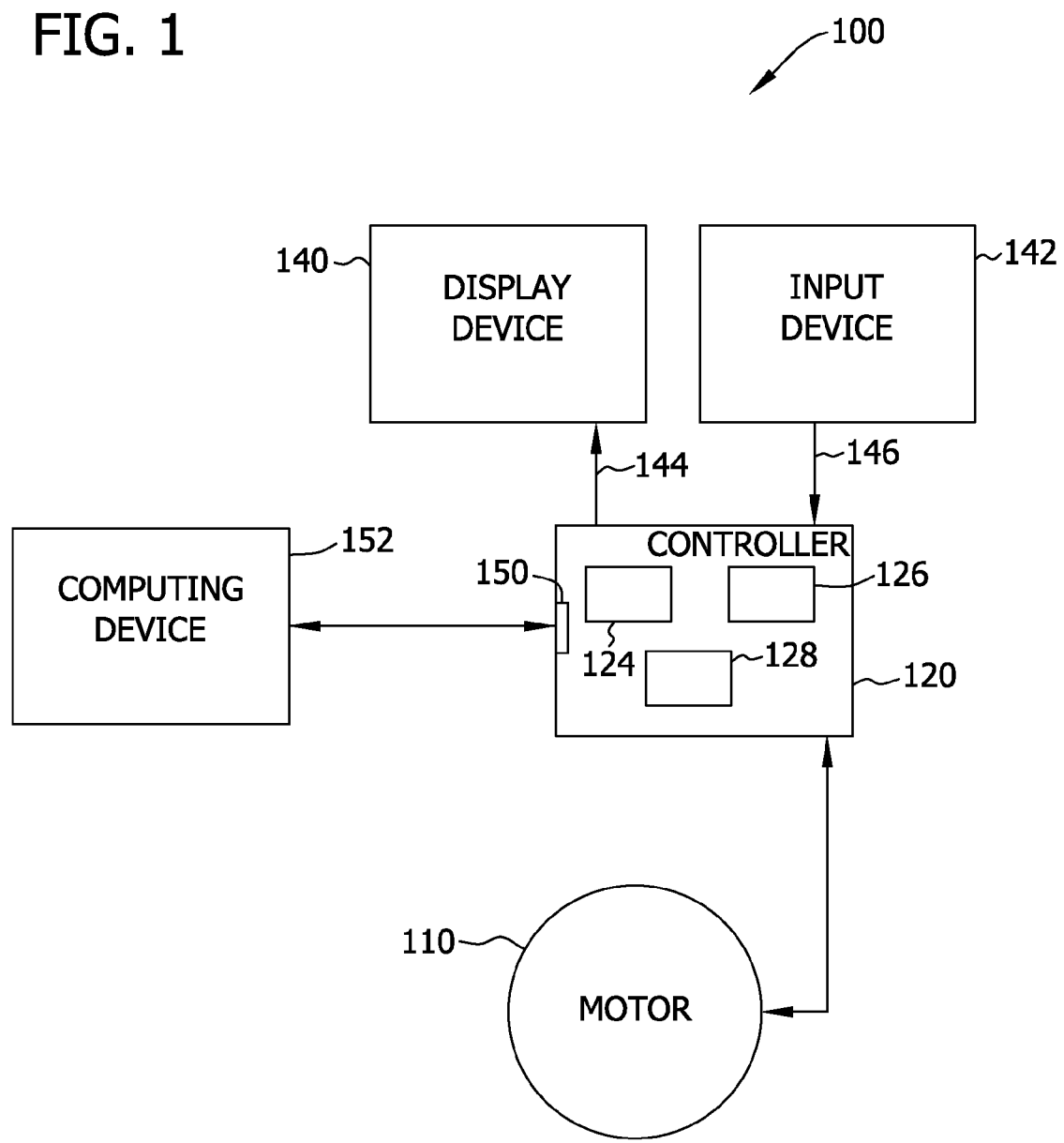
FIG. 1 is a block diagram of one embodiment of a motor control system.

FIG. 1 is a block diagram of an exemplary embodiment of a motor control system 100. In the exemplary embodiment, motor control system 100 controls operation of a motor 110. In some embodiments, motor 110 is a variable speed motor, for example, a brushless direct current (DC) motor, also referred to herein as an electronically commutated motor (ECM). However, motor 110 may be any other type of variable speed motor that facilitates operation of system 100 as described herein.

In the exemplary embodiment, system 100 includes a motor controller 120. In the exemplary embodiment, motor controller 120 includes a processing device 124, a memory device 126, and a motor drive circuit 128. Processing device 124 is communicatively coupled to memory device 126 and is configured to execute a program stored in memory device 126. In the exemplary embodiment, motor drive circuit 128 is configured to provide power to motor 110 based on instructions from processing device 124. In some examples, memory device 126 is an electrically erasable programmable read-only memory (EEPROM). In other examples, memory device 126 is an onboard flash memory device included within processing device 124. In other examples, memory device 126 is a ferromagnetic device, an electron spin device, and/or a backed-up random access memory (RAM). In still other examples, memory device 126 is any type of non-volatile memory device, internal or external to processing device 124, that enables motor controller 120 to function as described herein. As used herein, processing device 124 is not limited to just those integrated circuits referred to in the art as a processing device, but broadly refers to: a processor, a microprocessor, a digital signal processor, a controller, a microcontroller, a programmable logic controller, an application specific integrated circuit, and other programmable circuits.

In the exemplary embodiment, system 100 also includes a display device 140 and an input device 142, both coupled to motor controller 120, and more specifically, to processing device 124. Although illustrated as separate devices, display device 140 and input device 142 may be included within a single component. Display device 140 and input device 142 may be coupled to motor controller 120 through interfaces 144 and 146, respectively. However, display device 140 and input device 142 may be coupled to motor controller 120 through a single, bidirectional wire interface, or using a wireless interface (not shown in FIG. 1). Display device 140 and input device 142 are described further below.

In the exemplary embodiment, motor controller 120 is configured to regulate electric power provided to motor 110 in accordance with motor profiles stored in memory device 126. In the exemplary embodiment, memory device 126 stores a plurality of different motor profiles. A listing or description of the plurality of motor profiles is referred to herein as a catalog of motor profiles stored in memory device 126. Motor controller 120 facilitates a user selecting one of the motor profiles stored in memory device 126. For example, motor controller 120 receives an input from input device 142, interprets the input, and sends a corresponding command to motor 110, display device 140, and/or memory device 126. The command may include selecting one of the motor profiles stored in memory device 126 for execution by processing device 124. Motor controller 120 may also send a signal to display device 140, the signal facilitating viewing of the catalog of motor profiles stored in memory device 126.

In some embodiments, motor controller 120 also includes a communications port/jack 150 configured to couple motor controller 120 to an external source, for example, an external computing device 152. In an exemplary embodiment, external computing device 152 is a personal computer (PC) that is configured to facilitate modification of the catalog of stored motor profiles. For example, computing device 152 may allow a user to download new motor profiles from a web site and transfer the new profiles to system 100 for storage in memory device 126, and eventual execution by processing device 124. In other examples, computing device 152 may include software that facilitates user customization of the stored motor profiles. In further examples, computing device 152 may facilitate updating of other software included in system 100 and/or troubleshooting of problems encountered by system 100.

Figure 2:
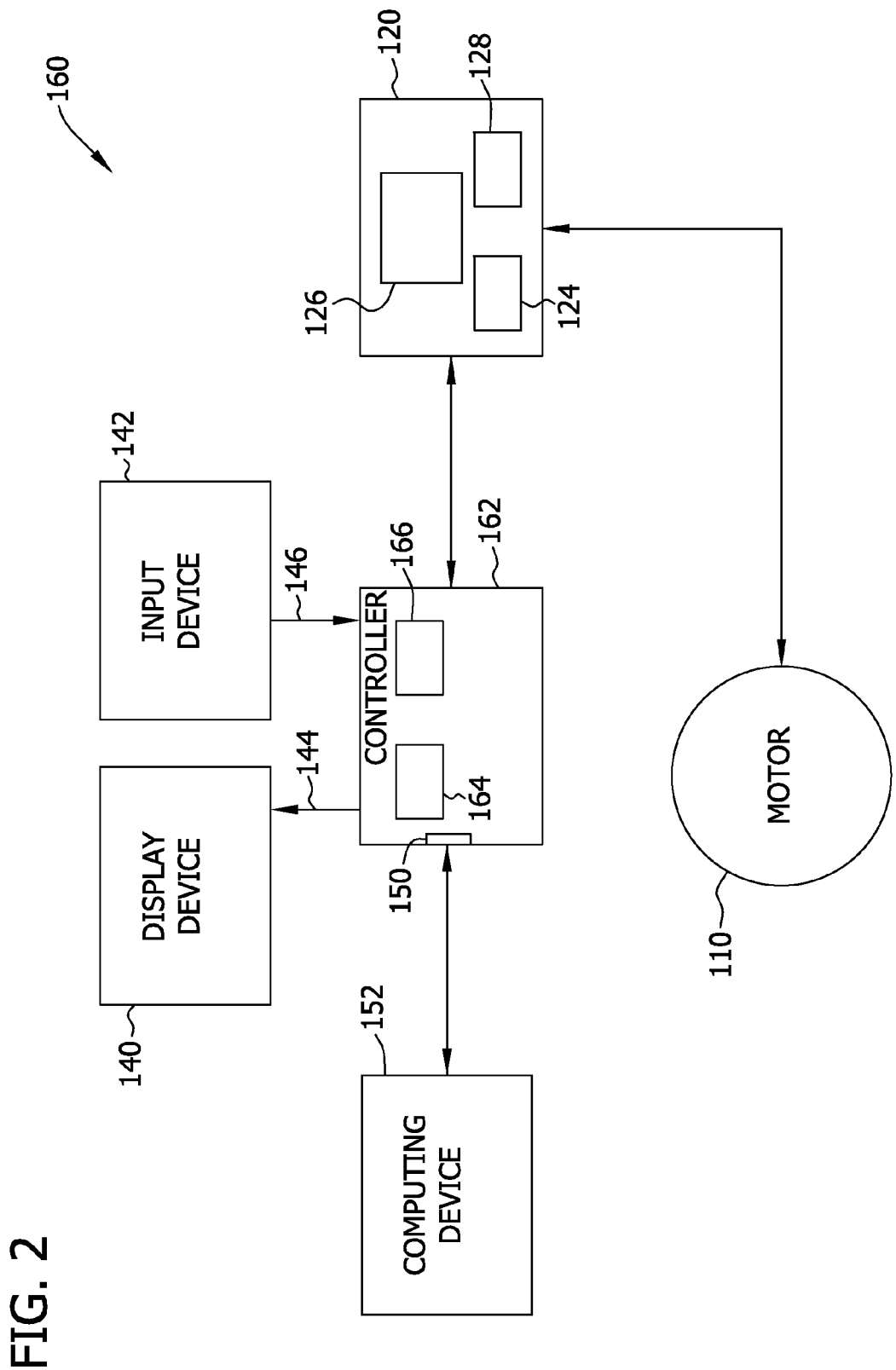
FIG. 2 is a block diagram of an alternative embodiment of the motor control system shown in FIG. 1.

FIG. 2 is a block diagram of an alternative embodiment of motor control system 160. In the alternative embodiment, motor control system 160 includes a system controller 162. In some embodiments, system controller 162 includes a processor 164 and a memory device 166. In the alternative embodiment, some of the functions of motor controller 120, described with respect to FIG. 1, are performed by system controller 162. For example, processor 164 may receive input signals from input device 142, interpret the input signal, and send a corresponding command to motor controller 120. Motor controller 120 may then supply motor 110 with control signals corresponding to the command provided by processor 164. Motor controller 120 may also return a motor profile catalog from memory device 126 to system controller 162 upon receipt of a motor profile catalog request from system controller 162. System controller 162 may also communicate through communications port/jack 150 with external computing device 152. Components that are common in both motor control systems 100 and 160 are identified using the same reference numerals.

Figure 3:
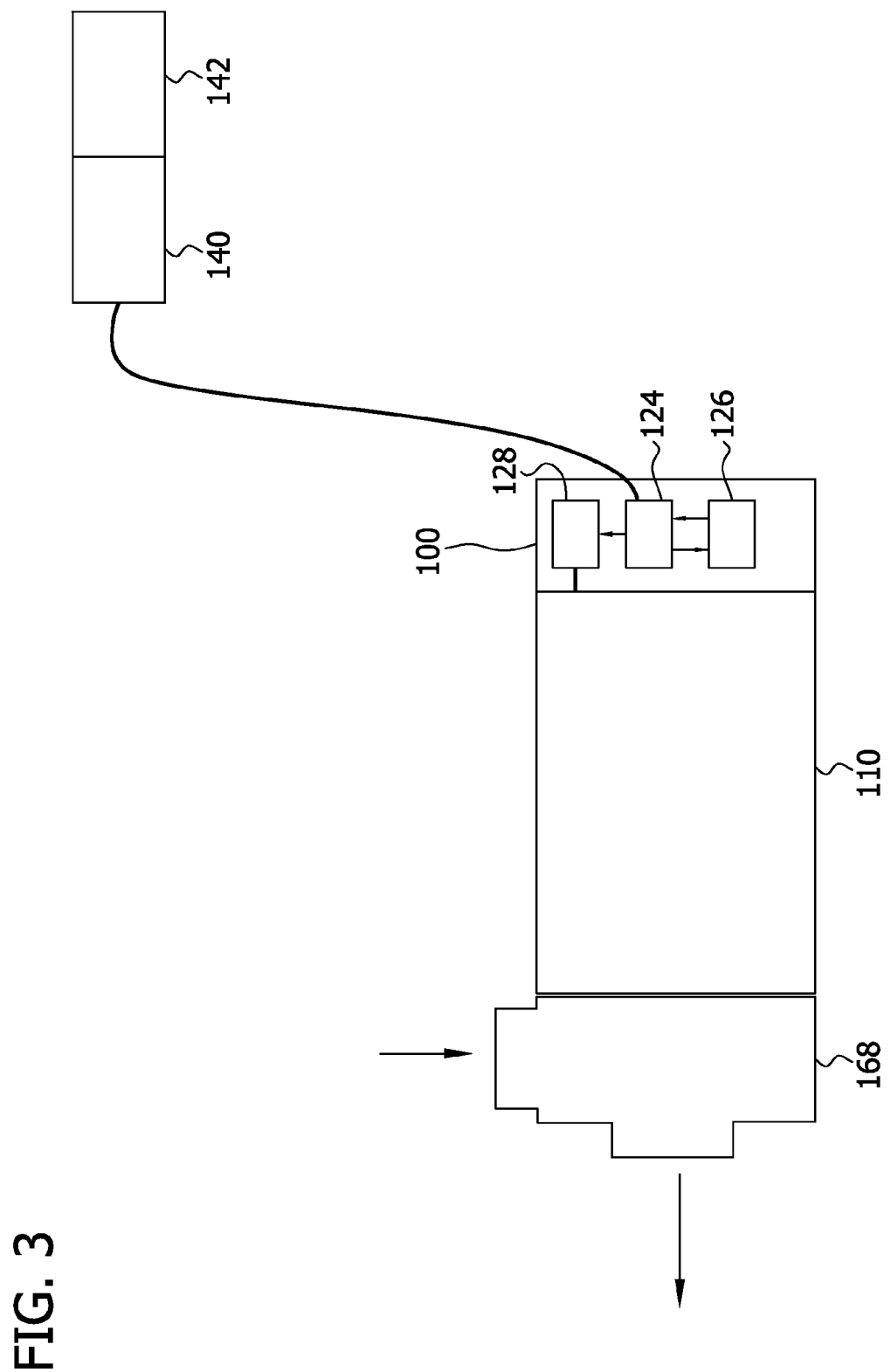
FIG. 3 is an exemplary embodiment of a specific application for the motor control systems shown in FIGS. 1 and 2.

FIG. 3 is an exemplary embodiment of a specific application for motor control system 100 (shown in FIG. 1). FIG. 3 illustrates motor 110 coupled to motor control system 100, in addition to a pump 168. As described above, in a spa/hot tub application, motor 110 and pump 168 may provide return water to an interior of a tub structure (not shown in FIG. 3). Components illustrated in FIG. 3 that are also illustrated in FIG. 1 are identified with corresponding reference numerals.

Figure 4:
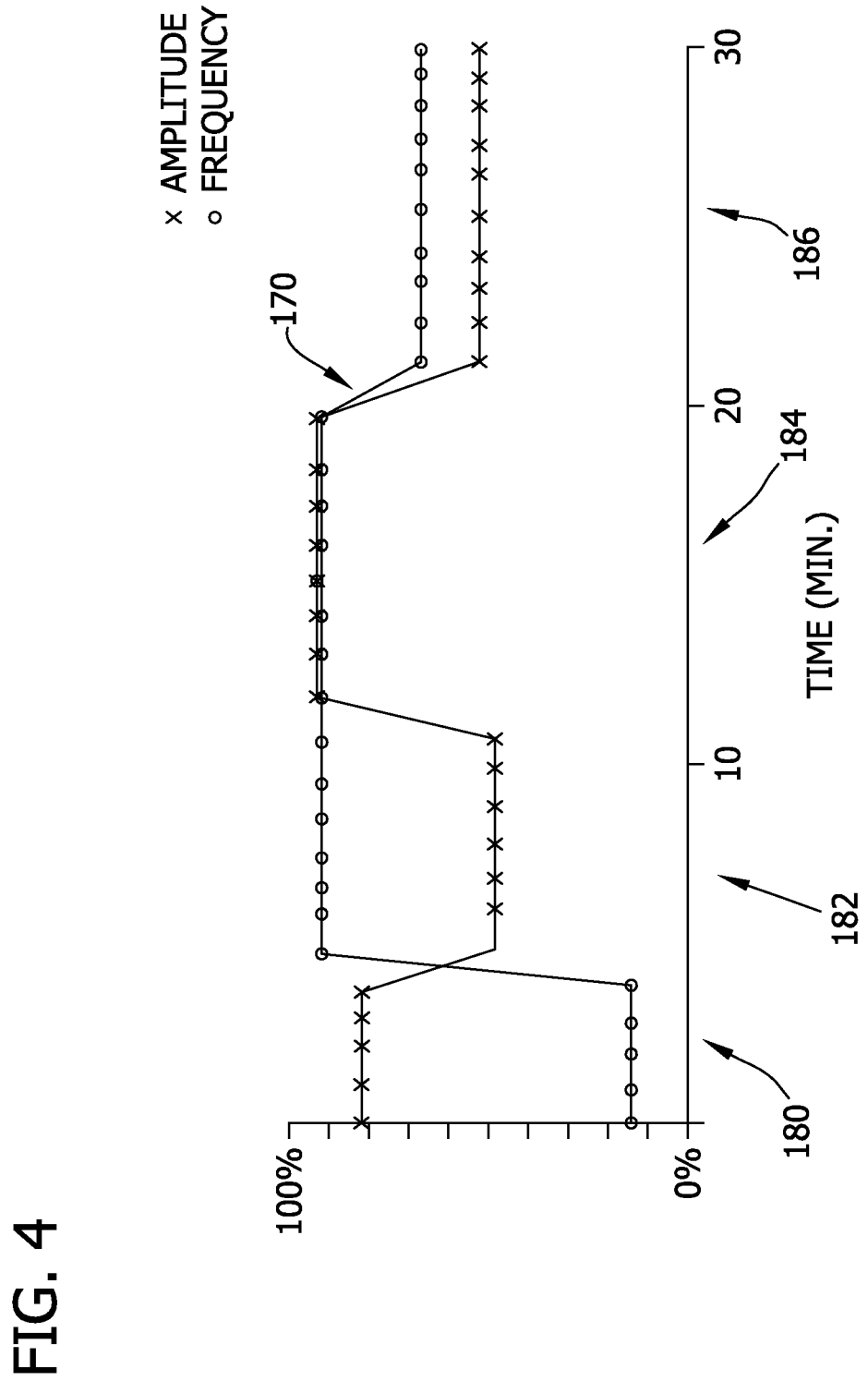
FIG. 4 is a graph illustrating an example of a motor profile.

FIG. 4 is a graph illustrating an exemplary motor profile 170. In the example embodiment of a spa/hot tub, motor 110 drives pump 168 (shown in FIG. 3), delivering water flow having an amplitude and a pulse frequency in accordance with a motor profile, for example, motor profile 170. In other words, motor profile 170 represents instructions that are sent to motor 110 to drive pump 168 at a predetermined amplitude and pulse frequency. To facilitate driving of pump 168 at a predetermined amplitude and pulse frequency, an output torque and/or a speed of motor 110 is automatically varied versus time according to motor profile 170. Motor profile 170 includes a list of commands stored in, for example, memory device 126 (shown in FIG. 1). For example, in a specific embodiment, motor profile 170 includes motor control instructions for a thirty minute period of time. A first section 180 of motor profile 170 instructs motor 110 to operate pump 168 at 80% of a maximum pumping amplitude and at 20% of a maximum pulsing frequency for five minutes. A second section 182 of motor profile 170 then instructs motor 110 to operate pump 168 at 50% of the maximum pumping amplitude and at 90% of the maximum pulsing frequency for seven minutes. A third section 184 of motor profile 170 then instructs motor 110 to operate pump 168 at 90% of the maximum pumping amplitude and at 90% of the maximum pulsing frequency for eight minutes. A fourth section 186 of motor profile 170 then instructs motor 110 to operate pump 168 at 50% of the maximum pumping amplitude and at 60% of the maximum pulsing frequency for ten minutes. After the fourth section is complete, motor profile 170 is also complete. Although described above as including four sections lasting a total of thirty minutes, motor profile 170 may have any number of sections and control operation of motor 110 over any length of time.

Figure 5:
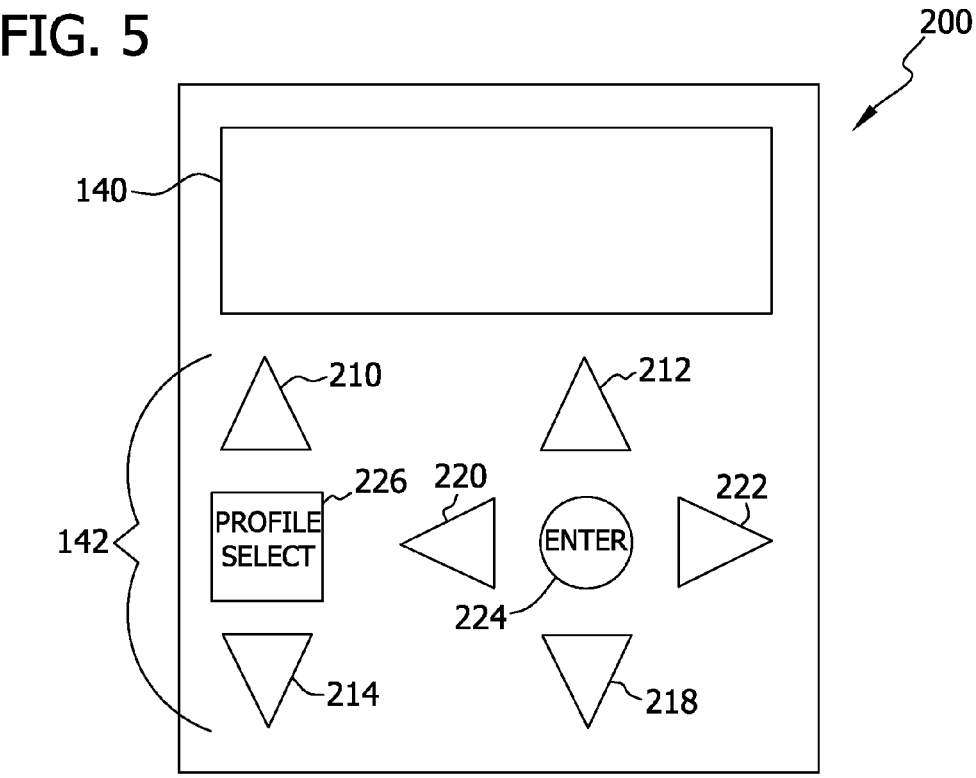
FIG. 5 is an illustration of an embodiment of the input device and the display device of the motor control system shown in FIG. 1.

FIG. 5 is an illustration of an exemplary embodiment of an input/display device 200. In the exemplary embodiment, input/display device 200 includes a display device, for example, display device 140 (shown in FIG. 1). In the exemplary embodiment, input/display device 200 also includes an input device, for example, input device 142 (shown in FIG. 1). In the exemplary embodiment, display device 140 includes a liquid crystal display (LCD) type screen, however, display device 140 may include any type of display that facilitates operation of input/display device 200 as described herein. In the exemplary embodiment, input device 142 includes multiple selection buttons, for example, UP buttons 210 and 212, DOWN buttons 214 and 218, a LEFT button 220, a RIGHT button 222, an ENTER button 224, and a PROFILE SELECT button 226. In the exemplary embodiment, buttons 210, 212, 214, 218, 220, 222, 224, and 226 facilitate navigating through screens displayed on display device 140, and entering user selections. Input device 142 facilitates allowing a user to view the motor profiles stored in memory device 126. When a user would like to view a list of available motor profiles, input device sends a catalog request to processor 124, processor 124 interprets the request and sends the catalog request to memory device 126. Memory device 126 returns the motor profile catalog to processor 124, which then provides the catalog to display device 140 for viewing by the user. The list may include pre-stored motor profiles, as well as user edited motor profiles.

Figure 6:
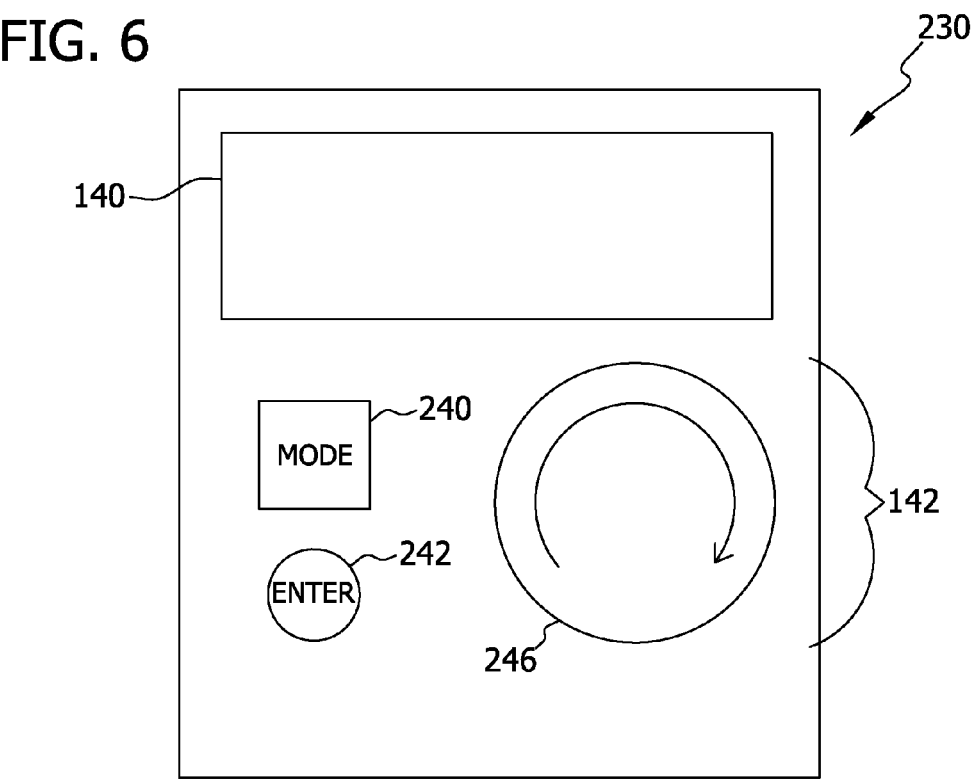
FIG. 6 is an illustration of an alternative embodiment of the input device and the display device of the motor control system shown in FIG. 1.

FIG. 6 is an illustration of an alternative embodiment of input/display device 200 (shown in FIG. 5), input/display device 230. In the alternative embodiment, rather than buttons 210, 212, 214, 218, 220, 222, 224, and 226 (shown in FIG. 5), input device 142 of input/display device 230 includes selection buttons 240 and 242, and a selection jog dial 246. Selection buttons 240 and 242, and selection jog dial 246 also facilitate navigating through screens displayed on display device 140, and entering user selections. In some embodiments, selection jog dial 246 may provide a push-to-select function that either replaces or supplements one of buttons 240 and 242. For example, selection jog dial 246 may be rotated to move through a plurality of menu items, and may be pushed to select one of the menu items.

Figure 7:
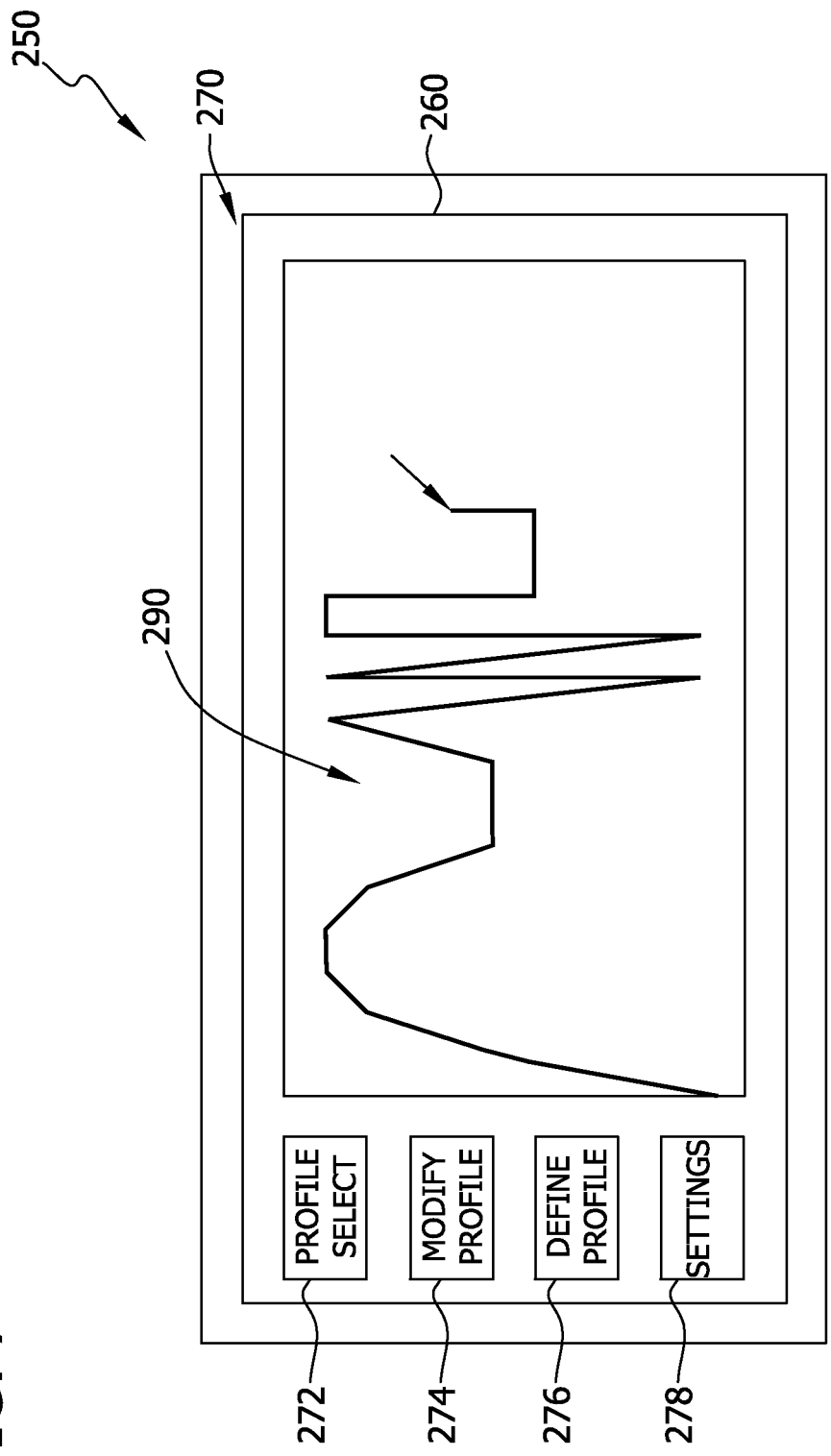
FIG. 7 is an illustration of another alternative embodiment of the input device and the display device of the motor control system shown in FIG. 1.

FIG. 7 is an illustration of a further alternative embodiment of input/display device 200 (shown in FIG. 5), input/display device 250. In the second alternative embodiment, input/display device 250 includes a touch screen display device 260. Touch screen display device 260 combines the functions of display device 140 (shown in FIG. 1) and input device 142 (shown in FIG. 1). More specifically, touch screen display device 260 facilitates displaying input options to a user as well as displaying motor profiles to select and/or view. FIG. 7 illustrates a sample display 270 that may be provided by touch screen display device 260. Sample display 270 provides a user with sections of display device 260 that correspond to a SELECT PROFILE input 272, a MODIFY PROFILE input 274, a DEFINE PROFILE input 276, and a SETTINGS input 278. Touch screen display device 260 provides an input signal to a motor controller, for example, motor controller 120 (shown in FIG. 1), when a user touches the section corresponding to one of inputs 272, 274, 276, and 278. In the example illustrated in FIG. 7, sample screen-shot 270 also provides a user with a display of one of the motor profiles 290 stored in a memory device, for example, memory device 126 (shown in FIG. 1).

FIG. 8 is a flow chart 300 of an exemplary method 310 for editing a motor profile. More specifically, method 310 facilitates editing a motor profile, for example motor profile 170 (shown in FIG. 4) for use by a brushless DC motor, for example motor 110 (shown in FIG. 1). In the exemplary embodiment, method 310 includes receiving 320 a stored motor profile selection via a user interface, for example, input/display device 200 (shown in FIG. 5). In the exemplary embodiment of a spa/hot tub, the stored motor profile includes amplitude and frequency information, which when provided to, for example, motor drive circuit 128 and/or motor 110 (shown in FIG. 1), facilitate operating motor 110 in accordance with a selected motor profile, for example, motor profile 170 (shown in FIG. 4).

In the exemplary embodiment, method 310 also includes displaying 330 the selected motor profile via the user interface, for example, input/display device 200 (shown in FIG. 5). Displaying 330 may include providing a list of motor profile names on display device 140 (shown in FIG. 5), providing a list of numbers on display device 140 (shown in FIG. 5) that correspond to numbers of stored motor profiles, or providing a graphical view, for example motor profile 290 (shown in FIG. 7), of each motor profile. In the exemplary embodiment, input/display device 200 (shown in FIG. 5) is configured to facilitate user selection of a motor profile and facilitate editing of the motor profile. For example, input device 142 (shown in FIG. 5) is configured to provide user inputs to motor controller 120, and motor controller 120 is configured to receive user inputs from input device 142 and interpret the user inputs. The user inputs may correspond to a motor profile selection and/or motor profile editing instructions.

In the exemplary embodiment, method 310 also includes receiving 332 user inputs via the user interface. In the exemplary embodiment, the user inputs include instructions relating to an edit of the selected motor profile. Method 310 also includes storing 334 the edited motor profile. Storing 334 the edited motor profile may include storing the edited motor profile as a new motor profile in, for example, memory device 126 (shown in FIG. 1). Storing 334 may also include replacing the selected motor profile with the edited motor profile.

As described above, in the example of a spa/hot tub, motor 110 (shown in FIG. 3) may be instructed to drive pump 168 (shown in FIG. 3) to pump water into the tub structure at predetermined amplitudes and at predetermined pulsing frequencies, for predetermined periods of time. The instructions are summarized in a motor profile. For example, sample motor profile 170 (shown in FIG. 4), includes four sections of different amplitude and pulsing frequencies. Input device 142 facilitates a user selecting a motor profile and editing/modifying the motor profile. Editing the motor profile may include, but is not limited to, increasing the amplitude of all motor profile amplitudes by a user defined amount, reducing the amplitude of all motor profile amplitudes by a user defined amount, increasing/decreasing the amplitude of an individual motor profile section, increasing/decreasing the length of the motor profile, increasing/decreasing the length of an individual motor profile section, increasing/decreasing the pulsing frequencies of all motor profile pulsing frequencies by a user defined amount, reducing the pulsing frequencies of all motor profile pulsing frequencies by a user defined amount, increasing/decreasing the pulsing frequency of an individual motor profile section, or repeating one or more sections of the motor profile. Editing the motor profile facilitates a customized experience for the user.

FIG. 9 is a flow chart 400 of an exemplary method 410 for end user operation of a variable speed motor. In the exemplary embodiment, the end user operation of the variable speed motor, for example, motor 110 (shown in FIG. 1), is controlled based on at least one stored motor profile, for example, motor profile 170 (shown in FIG. 4). In the exemplary embodiment, method 410 includes accessing 420 a stored motor profile using a control system input device, for example input/display device 200 (shown in FIG. 5). In the example continued herein of a spa/hot tub, stored motor profile 170 (shown in FIG. 4) for motor 110 (shown in FIG. 1) may be accessed 420 through input/display device 200 (shown in FIG. 5) by a user. In the exemplary embodiment, method 410 also includes editing 422 the stored motor profile using input/display device 200.

In the exemplary embodiment, method 410 also includes providing 424 the edited motor profile to motor 110 and operating 426 the motor in accordance with the edited motor profile. In some embodiments, the edited motor profile is stored in a memory device, for example, memory device 126 (shown in FIG. 1). In some embodiments, operating 426 the variable speed motor in accordance with the edited motor profile comprises editing the motor profile during operation of the variable speed motor, wherein the motor responds to the edited motor profile substantially instantaneously.

Described herein are exemplary systems and methods for controlling operation of a motor. More specifically, the systems and methods described herein enable a user to select and edit motor profiles that control operation of the motor. In the example of a spa/hot tub, the systems and methods described herein allow a user to select a motor profile, as well as to edit the motor profile, while using the spa/hot tub. The systems and methods described herein allow storage and user access to multiple motor profiles, and more specifically, to a plurality of editable motor profiles.

The systems and methods described herein facilitate efficient and economical control of a motor. The systems and methods described herein also facilitate efficient and economical operation of an application that includes a variable speed motor. For example, a spa/hot tub that includes an ECM and the control system described herein facilitates increased motor efficiency and reduced heating of the motor throughout a motor profile when compared to, for example, an induction motor.

Exemplary embodiments of systems and methods are described and/or illustrated herein in detail. The systems and methods are not limited to the specific embodiments described herein, but rather, components of each system, as well as steps of each method, may be utilized independently and separately from other components and steps described herein. Each component, and each method step, can also be used in combination with other components and/or method steps. More specifically, although described herein with respect to a spa/hot tub application, the systems and methods described herein are not limited to spa/hot tub applications. For example, the systems and methods described herein may be included in commercial refrigeration products, as well as other refrigeration/heating, ventilation, and air conditioning systems. In a specific example, motor profiles are stored that facilitate efficient operation of commercial refrigeration products by changing motor operation at predetermined times, for example, at predetermined times of the year. In another example, motor profiles vary the speed/torque of a motor, such that a specific speed/torque is not set once and never varied.

As described herein, in certain embodiments, the output torque and/or speed of a variable speed motor is automatically varied versus time according to a preset motor profile, implemented through a microcontroller based variable speed control by accessing a list of commands stored in an internal/external non-volatile memory. Automatically varying the torque and/or speed of the variable speed motor provides at least the following benefits: allowing a user to store multiple desired motor profiles in the memory, allowing the stored motor profiles to be identified with a name-tag, allowing a system controller to request a catalog of stored profiles, allowing a user to select a desired profile for execution and having the motor's microcontroller execute that profile, and during profile execution, allowing the user to dynamically scale the entire profile over time, dynamically scale the pulse amplitude, and also dynamically offset the pulse for an altered profile execution. The user may also have multiple repeats of any section of the executed profile.

More specifically, for spa/hot tub applications, users may view the available profiles in the form of a catalog so that, with reference to the available categories of profiles, the user can switch from one profile to another. In some embodiments, the catalog request is provided by the system controller to the motor controller and the motor controller provides a list of available profiles to the system controller by reading the motor's memory. Furthermore, the systems and methods described herein facilitate customizing the selected profile as per individual user comfort. In other words, the user can dynamically scale the entire profile over time to have a faster/slower pulse, and/or a higher/lower pulse amplitude. In some embodiments, a requirement to maintain a minimum flow rate may be satisfied by adding an offset value to the pulse profile. The offset value would prevent a user from reducing pump flow below a recommended level, for example, below a level recommended that corresponds to a heating temperature selected. The offset, amplitude scale, and time scale may be user defined and vary dynamically as per individual comfort level requests sent to the motor from the system controller.

When introducing elements/components/etc. of the methods and apparatus described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for editing a motor profile, said method comprising:
   receiving a stored motor profile selection via a user interface, wherein a stored motor profile associated with the stored motor profile selection includes output torque instructions that correspond to at least one of a pumping amplitude and a pulsing frequency;
   receiving user inputs via the user interface, the user inputs including instructions relating to an edit of the selected motor profile; and
   storing the edited motor profile.

2. A method in accordance with claim 1, wherein receiving the stored motor profile selection via the user interface comprises receiving a user selection of motor control instructions comprising at least one of time-varying output torque instructions and time-varying motor speed instructions that correspond to at least one of a pumping amplitude and a pulsing frequency.

3. A method in accordance with claim 1 further comprising displaying the selected motor profile via the user interface.

4. A method in accordance with claim 3, wherein displaying the selected motor profile comprises displaying at least one of a graphical representation of the motor profile and a list of motor control instructions via the user interface.

5. A method in accordance with claim 1, wherein receiving user inputs via the user interface comprises receiving user inputs to at least one of: increase the amplitude of all motor profile amplitudes by a user defined amount, reduce the amplitude of all motor profile amplitudes by a user defined amount, increase/decrease the length of the motor profile, and increase/decrease the pulsing frequencies of all motor profile pulsing frequencies by a user defined amount.

6. A method in accordance with claim 1, wherein storing the edited motor profile comprises at least one of storing the edited motor profile as a new motor profile and replacing the selected motor profile with the edited motor profile.

7. A method in accordance with claim 1, wherein receiving user inputs via the user interface comprises receiving user inputs to at least one of: increase/decrease the amplitude of an individual motor profile section, increase/decrease the length of an individual motor profile section, and increase/decrease the pulsing frequency of an individual motor profile section.

8. A method in accordance with claim 1, wherein receiving user inputs via the user interface comprises receiving user inputs to repeat one or more sections of the motor profile.

9. A method in accordance with claim 1, further comprising providing a catalog of stored motor profiles to the user interface for display by the user interface.

10. A method in accordance with claim 9, wherein receiving a stored motor profile selection comprises receiving a selection of a motor profile included within the catalog of motor profiles via the user interface.

11. A method in accordance with claim 10, wherein storing the edited motor profile comprises adding the edited motor profile to the catalog of motor profiles.

12. A method for end user operation of a variable speed motor, wherein operation of the variable speed motor is controlled based on at least one stored motor profile, said method comprising:
accessing a stored motor profile using a control system input device, wherein the stored motor profile includes output torque instructions that correspond to at least one of a pumping amplitude and a pulsing frequency;
editing the stored motor profile using the control system input device;
storing the edited motor profile;
providing the edited motor profile to the variable speed motor; and
varying an output torque of the variable speed motor in accordance with the edited motor profile.

13. A method in accordance with claim 12, wherein operating the variable speed motor in accordance with the edited motor profile comprises editing the motor profile during operation of the variable speed motor, wherein the motor responds to the edited motor profile substantially instantaneously.

14. A method in accordance with claim 12, wherein editing the stored motor profile comprises at least one of: increasing the amplitude of all motor profile amplitudes by a user defined amount, reducing the amplitude of all motor profile amplitudes by a user defined amount, increasing/decreasing the length of the motor profile, and increasing/decreasing the pulsing frequencies of all motor profile pulsing frequencies by a user defined amount.

15. A method in accordance with claim 12, wherein accessing the stored motor profile comprises accessing a stored motor profile for a motor installed in a spa/hot tub application.

16. A method in accordance with claim 12, wherein accessing the stored motor profile comprises requesting a catalog of stored motor profiles from a motor control system memory device.

17. A method in accordance with claim 16, wherein storing the edited motor profile comprises adding the edited motor profile the catalog of motor profiles stored in the motor control system memory device.

18. A method in accordance with claim 12, wherein accessing the stored motor profile further comprises displaying the accessed motor profile.

19. A method in accordance with claim 12, wherein editing the stored motor profile comprises at least one of: increasing/decreasing the amplitude of an individual motor profile section, increasing/decreasing the length of an individual motor profile section, and increasing/decreasing the pulsing frequency of an individual motor profile section.

20. A method in accordance with claim 12, wherein editing the stored motor profile comprises repeating one or more sections of the motor profile.

21. A motor control system comprising:
a processing device;
a memory device coupled to said processing device and configured to store a catalog of motor profiles that includes at least one motor profile, wherein the at least one motor profile includes output torque instructions that correspond to at least one of a pumping amplitude and a pulsing frequency;
a display device coupled to said processing device and configured to display at least one of the catalog of motor profiles and motor profile editing options; and
an input device coupled to said processing device and configured to provide said processing device with motor profile editing instructions from a user, said processing device configured to provide the edited motor profile to a variable speed motor and store the edited motor profile in said memory device.

22. A motor control system in accordance with claim 21, wherein said processing device comprises at least one of a processor, a microprocessor, a digital signal processor, a microcontroller, a programmable logic controller, and an application specific integrated circuit.

23. A motor control system in accordance with claim 21, wherein said processing device is configured to request the catalog of motor profiles from said memory device.

24. A motor control system in accordance with claim 23, wherein said memory device is further configured to provide the catalog of motor profiles to said processing device upon request.

25. A motor control system in accordance with claim 21, wherein said memory device comprises at least one of an electrically erasable programmable read-only memory (EEPROM), a flash memory device, a ferromagnetic device, an electron spin device, and a backed-up random access memory (RAM).

26. A motor control system in accordance with claim 21, wherein said display device comprises a liquid crystal display type screen.

27. A motor control system in accordance with claim 21, wherein said input device comprises at least one of a plurality of buttons, a jog dial, and a touch screen.

28. A motor control system in accordance with claim 21, wherein said motor profile editing instructions comprise at least one of: increase the amplitude of all motor profile amplitudes by a user defined amount, reduce the amplitude of all motor profile amplitudes by a user defined amount, increase/decrease the amplitude of an individual motor profile section, increase/decrease the length of the motor profile, increase/decrease the length of an individual motor profile section, increase/decrease the pulsing frequencies of all motor profile pulsing frequencies by a user defined amount, reduce the pulsing frequencies of all motor profile pulsing frequencies by a user defined amount, increase/decrease the pulsing frequency of an individual motor profile section, and repeat one or more sections of the motor profile.

29. A motor control system in accordance with claim 21, wherein said catalog of motor profiles comprises at least one of a list of motor profile names that correspond to the at least one motor profile, and at least one graph that corresponds to the at least one motor profile.

30. A motor control system in accordance with claim 21, further comprising a communications port coupled to said processing device, wherein the communications port is at least one of wired to and wireless from an external source, the communications port configured to facilitate receiving motor profiles from the external source.

* * * * *